United States Patent [19]

Dockery

[11] 4,216,090
[45] Aug. 5, 1980

[54] UNDER GRAVEL AQUARIUM FILTER

[76] Inventor: Denzel J. Dockery, P.O. Box 7048, Flint, Mich. 48507

[21] Appl. No.: 933,472

[22] Filed: Aug. 14, 1978

[51] Int. Cl.² .............................................. A01K 63/00
[52] U.S. Cl. ....................................... 210/169; 119/5
[58] Field of Search ................... 119/5, 3, 2; 210/169

[56] References Cited
U.S. PATENT DOCUMENTS

| | | | |
|---|---|---|---|
| 3,135,238 | 6/1964 | Eyl | 119/5 |
| 3,738,491 | 6/1973 | Dockery | 210/169 |
| 3,889,639 | 6/1975 | Day et al. | 119/2 |
| 4,004,551 | 1/1977 | Kato | 119/5 |

Primary Examiner—Hugh R. Chamblee
Attorney, Agent, or Firm—Gifford, VanOphem, Sheridan & Sprinkle

[57] ABSTRACT

A circulating system for an aquarium is provided in which a grid is positioned within the aquarium and disposed upwardly from the bottom of the aquarium to form a chamber between the grid and the bottom of the aquarium while gravel is disposed over the top side of the grid. A novel pump is provided for pumping the aquarium water to the chamber between the bottom of the aquarium and the grid whereby waste material and debris is collected on the underside of the gravel and eliminated by natural decay or backwashing of the gravel.

9 Claims, 4 Drawing Figures

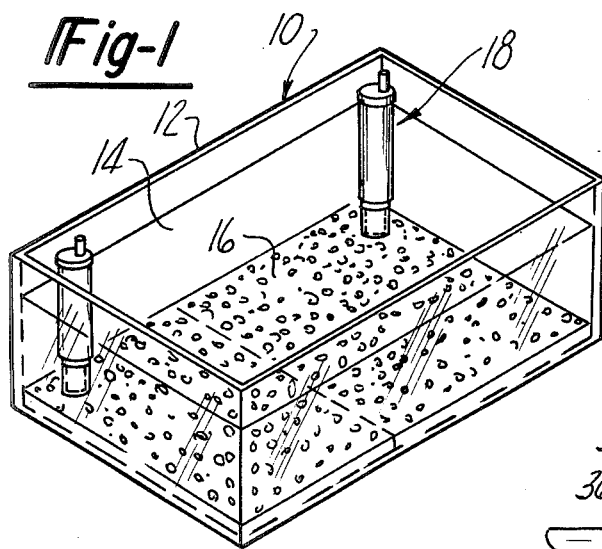
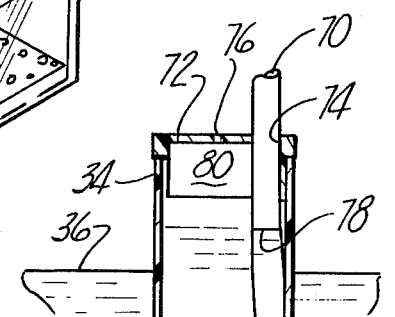
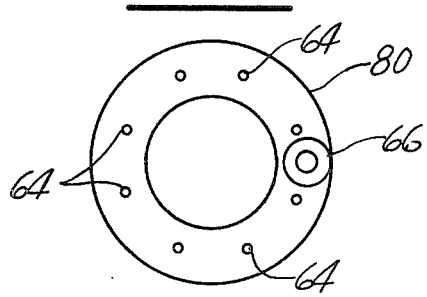
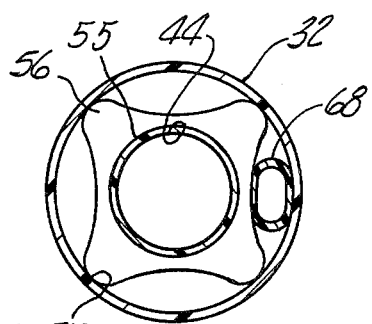
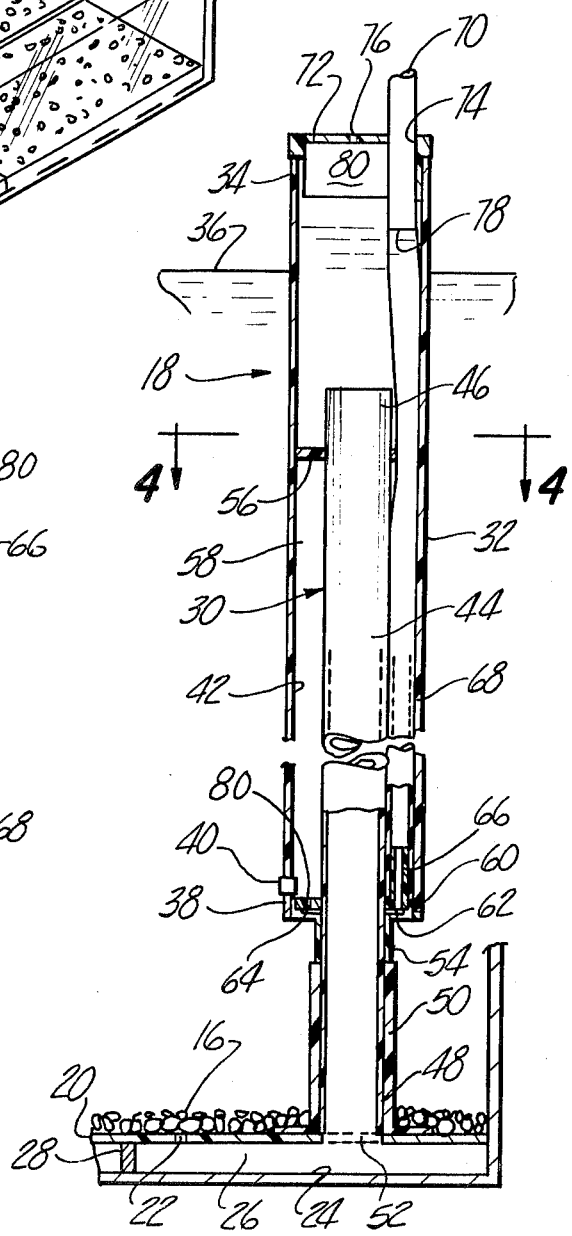

UNDER GRAVEL AQUARIUM FILTER

BACKGROUND OF THE INVENTION

I. Field of the Invention

The present invention relates generally to water filtering and circulating systems for aquariums and, more particularly, to such a system in which the waste material is trapped between the gravel and the bottom of the aquarium where it can be eliminated by decay or backwashing.

II. Description of the Prior Art

Many aquarium systems in present use employ gravel at the bottom of the tank which acts as a filter for the water circulation system. Conventionally, a suction pump draws the water from a chamber formed beneath the gravel so that the water continually flows downwardly onto the gravel in the tank. In this process, waste material and other debris is removed from the water by the gravel which, after a period of time requires washing of the gravel in order to prevent contamination of the tank. The gravel can be effectively washed only by the difficult and time consuming process of removing the gravel from the tank.

Because the previously known aquarium circulating systems produce water flow down onto the top of the gravel, the septic line produced by the decaying impurities and sediment remain near the top surface of the gravel. Consequently, upon the accumulation of too great of an amount of decay upon the gravel, the decay caused by the septic line disadvantageously contaminates the entire aquarium tank.

In my prior U.S. Patent, U.S. Pat. No. 3,738,491, which issued on June 12, 1973, I described an aquarium circulating system which overcame the disadvantages of the aforementioned aquarium systems. In brief, in my prior system the direction of water flow through the gravel is reversed so that the water flows upwardly, instead of downwardly through the gravel. In this fashion, the septic line formed by the decay of waste products and other debris removed from aquarium water remains at or near the bottom of the gravel so that the waste materials decay with less toxic effects on the aquarium and where the septic line is less apt to be accidently disturbed or uncovered. Moreover, the gravel can be effectively cleaned by backflushing so that the removal of the gravel from the tank to clean it is not required.

My prior under gravel aquarium filter, however, suffered several disadvantages in operation. One such disadvantage is that during the operation of my prior device a water and air spray is continuously emitted through vent openings in the upper portion of the device. This water spray is not only distracting when viewing the aquarium but also impinges upon aquarium components such as the aquarium light and the like. This water spray often-times undesirably causes rust and corrosion of these components. Moreover, this water spray also resulted in excessive and rapid water evaporation from the aquarium tank.

A still further disadvantage of my prior device is that the device itself is quite bulky in construction and thus occupies an appreciable volume of the overall aquarium. The bulky construction thus unnecessarily detracts from the overall beauty of the aquarium.

SUMMARY OF THE PRESENT INVENTION

The present invention overcomes these above-mentioned disadvantages of the prior known devices by providing a water circulating and filtering system similar in operation to my afore-mentioned device but which eliminates the undesirable water spray and which is also compact and attractive in construction.

In brief, the circulating and filtering system according to the present invention comprises a grid disposed upwardly from the bottom of the aquarium and thus defines a chamber between the bottom of the aquarium and the underside of the grid. Gravel or a similar aggregate material is deposited on the upper side of the grid.

The novelty of the instant application, however, resides in the pumping means for pumping the aquarium water from the aquarium and into the chamber below the grid. The pumping means includes an elongated tubular cylindrical housing vertically positioned within the aquarium so that the upper end of the housing is above the aquarium water line. A tube extends coaxially through the housing so that the upper end of the tube is spaced downwardly from the upper end of the housing while the lower end of the tube fluidly communicates with the chamber beneath the grid. The tube thus defines an annular pump chamber between the interior of the housing and the outer periphery of the tube.

An air pump is connected by suitable conduit means to an air distributor or nozzle positioned at the lower end of the housing and open to the lower end of the annular pump chamber. Upon activation of the air pump, the upward flow of air through the pump chamber forces the water contained therein upwardly above the upper end of the tube and forms an elevated water head. This water then flows downwardly through the tube and into the chamber between the grid and the bottom of the aquarium in the desired fashion.

Because the housing extends upwardly above the upper end of the tube, any water spray created by the upward air flow through the pump chamber is completely contained within the interior of the housing so as not to corrode or otherwise damage external aquarium components. Moreover, since all of the air flow into the annular pump chamber is utilized to provide the head pressure, a lesser amount of air flow is required to produce the same flow rate through the tube than in my prior device. In addition, the overall device according to the present invention is compact in construction so as not to distract from the overall beauty of the aquarium.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which:

FIG. 1 is a perspective view of a typical aquarium utilizing the system according to the present invention;

FIG. 2 is a cross-sectional view of the device according to the present invention;

FIG. 3 is a sectional view taken substantially along line 3—3 in FIG. 2 and enlarged for clarity; and FIG. 4 is a sectional view taken substantially along line 4—4 in FIG. 2 and enlarged for clarity.

DETAILED DESCRIPTION OF THE PRESENT INVENTION

With reference first to FIG. 1, a conventional aquarium 10 is thereshown comprising a tank 12 containing water 14. Gravel 16 is contained within the bottom of the tank 12 in a fashion which will be subsequently more fully described while aquatic pets (not shown) live within the aquarium. A pair of circulating assemblies 18 are disposed at two corners of the aquarium tank 12 for circulating and filtering the aquarium water 14 in a manner which will also subsequently be described in greater detail. Each circulating assembly 18 is substantially identical to the other so that only one will be described in detail, it being understood that the same description shall equally apply to the other assembly 18.

With reference now to FIGS. 2-4, one circulating assembly 18 is thereshown and comprises a metal or plastic grid 20 having a plurality of longitudinally extending slits 22 extending therealong. The grid 20 is positioned at the bottom 24 of the aquarium tank 12 and is spaced upwardly therefrom by support legs 28, thus forming a chamber 26 between the bottom side of the grid 20 and the bottom 24 of the aquarium tank 12. The gravel 16 is positioned on the top side of the grid 20 while a plurality of support legs 28 provide support for the grid 20 from the weight of the gravel 16. The longitudinally extending slits 22 through the grid 20 establish fluid communication between the chamber 26 and the main aquarium body in which the aquatic pets reside.

Still referring to FIGS. 2-4, the circulating assembly 18 further includes a pump means 30 for pumping water from the main aquarium body 27 and into the chamber 26. The pump means 30 includes a tubular cylindrical housing 32 vertically positioned with the interior of the aquarium tank 14 so that the upper end 34 of the housing extends above the aquarium water line 36. A plurality of circumferentially spaced radial openings 40 are formed about the lower end 38 of the housing 32 and establish fluid communication between the main aquarium body and the interior 42 of the housing 32.

An elongated tube 44 extends coaxially through the housing 32. The upper end 46 of the tube 44 is spaced downwardly from the upper end 34 of the housing 32 and is open to the interior 42 of the housing. The lower end 48 of the tube 44 is received within a sleeve 50 secured by suitable means (not shown) to the grid 20 and registers with an opening 52 in the grid 20 to provide fluid communication from the interior of the tube 44 and into the chamber 26. The tube 44 furthermore frictionally engages a reduced neck portion 54 at the lower end 38 of the housing 32 and thus maintains the pump means 30 in a substantially vertical position with respect to the aquarium 10.

A spacer 56, best shown in FIG. 4, includes a ring portion 55 secured around the tube 44 at a position spaced downwardly from the upper end 46 of the tube 44. A plurality of circumferentially spaced legs 57 extend radially outwardly from the ring 55 and engage the inner periphery 42 of the housing 32 to maintain the tube 44 coaxial with and spaced radially inwardly from the housing 32 and thus defining an annular pump chamber 58 between the housing 32 and the tube 44. The spacer legs 57 are smaller in size so as not to interfere with fluid flow through the annular chamber 58.

An air distributor or nozzle means 60, best shown in FIGS. 2 and 3, is positioned at the bottom of the pump chamber 58 and beneath the housing openings 40 for providing an upward air flow through the pump chamber 58. The nozzle means 60 comprises a flat annular disc 80 disposed around the tube 44 spaced upwardly from the reduced neck portion 54 of the housing 32 thus defining an annular nozzle chamber 62 between the disc 80 and the reduced diameter neck portion 54. Preferably, the inner periphery of the disc 80 sealingly engages the tube 44 while the outer periphery of the disc sealingly engages the inner periphery 42 of the housing. A plurality of circumferentially spaced and axially extending apertures 64 are formed through the disc 80 and establish fluid communication between the chambers 62 and 58. A nipple 66 extends upwardly from the disc 80 and is connected via a flexible conduit 68 extending through the interior of the housing 32 to an air pump 70, illustrated only diagrammatically.

A cap 72 covers the open upper end 34 of the housing 32 and includes an opening 74 through which the flexible conduit 68 extends. A plurality of vent openings 76 are also formed through the cap 72.

Having described the component parts of my invention its operation is as follows:

With the circulating assembly mounted to the grid 20 and positioned within the aquarium 10 in the previously described fashion, activation of the air pump 70 pumps air under pressure through the conduit 68, the nipple 66 and into the chamber 62. From the chamber 62, the pressurized air exits via the disc openings 64 whereupon the air rises upwardly through the pump chamber 58. This upward air flow through the pump chamber 58 draws water from the housing openings 40 upwardly therewith and creates a water head 78 (FIG. 2) within the interior 42 of the housing 32 above the aquarium water level 36 and above the upper open end 46 of the tube 44. The air flow through the annular chamber 58 escapes through the vent opening 76 in the housing cap 72 but, since the housing 32 extends upwardly from and above the water head 78, a dead air space 80 is created between the water head and the cap 72. This air space 80 insures that all the water spray created by the air escaping from the water is wholly contained within the interior 42 of the housing 32.

Since the water head 78 is elevated above the water level 36 for the aquarium main body 27, the differential pressure created by the water head 78 in turn creates a downward flow through the tube 44 and into the chamber 26 beneath the grid 20. This water then flows upwardly through the longitudinal slits 22 in the grid 20 whereupon the debris and other waste material contained within the aquarium water is collected on the underside of the gravel 16 in the fashion more fully described in my aforementioned U.S. Letters Patent.

Backflushing of the gravel 16 to remove excess water material can be simply and rapidly achieved by removing the cap 72 from the housing 32 and connecting a suction line to the upper end 46 of the tube 44. Consequently, the required disassembly of the circulating assembly 18 for backflushing the gravel is kept to a minimum.

The circulating system 18 according to the present invention thus provides many advantages over the previously known aquarium circulating systems and over my prior patented device. In particular, the pump assembly 30 enjoys a very compact construction so as not to be obtrusive within the interior of the aquarium. Even the air pump conduit 68 is contained within the interior of the housing 32 which aids in the compact visual appearance of the pump assembly 30.

A still further advantage of the present invention over the prior art device is that all water spray created by the escape of air bubbles from the water is maintained within the interior of the housing 32 due to the air space 80. This provision not only eliminates the previously known corrosion of the exterior aquarium components but, also minimizes evaporation of the water from the tank due to the previously known external water spray.

A still further advantage of the present invention over the prior art devices is that only simple and only minimal disassembly of the pump assembly 30 is required in order to backwash the gravel.

A still further advantage of the present invention is that the radial width of the annular pump chamber 58 is relatively narrow in comparison to the overall cross-sectional area of the annular pump chamber 58. Consequently, the air flow upwardly through the annular chamber 58 produces a highly efficient pumping action so that less pressurized air is required to obtain the same flow rate into the grid chamber 26 as in my previous device.

Having described my invention, however, many modifications thereto will become apparent to those skilled in the art to which it pertains without deviation from the spirit of the invention as defined by the scope of the appended claims.

I claim:

1. A circulating system for an aquarium having water and a material such as gravel on the bottom of the aquarium, said system comprising:
   a grid disposed upwardly from the bottom of the aquarium to form a chamber between the bottom of the aquarium and the underside of said grid, said material being disposed on said grid;
   said chamber communicating with the water in said aquarium through said grid and through said material;
   means for pumping the water in said aquarium from a point above said grid and into said chamber, said pumping means further comprising:
   an elongated tubular housing having a first end positioned below the waterline of the aquarium and a second end positioned above the waterline of the aquarium, said housing including at least one port near its first end for establishing fluid communication between said aquarium water and the interior of the housing;
   conduit means extending longitudinally through a portion of the interior of said housing, said conduit means being open at its lower end to said chamber and open at its upper end to the interior of said housing; and
   means for raising water from the bottom of said housing to above the upper end of the conduit means and also above the waterline of the aquarium whereby water flows downwardly through said conduit means and into said chamber, said raising means further comprising an air pump having a compressed air outlet and means for fluidly connecting said compressed air outlet to the interior of said housing at its lower end, said conduit means extending substantially coaxially through said housing, said conduit means being spaced inwardly from said housing and forming an annular pump chamber therebetween and said raising means further comprising means for raising water from the bottom of said annular pump chamber to above the open upper end of the conduit means, said fluid connecting means further comprising an air nozzle having an inlet and at least one outlet, said air nozzle being positioned within the interior of said housing and at the lower end of the annular chamber, an air tube for connecting the air pump outlet to the air nozzle inlet and said air nozzle outlet being open to said annular chamber, said housing including a reduced diameter neck portion which engages said conduit means and said air nozzle being annular in shape and spaced upwardly from said reduced diameter neck portion thereby forming a nozzle chamber therebetween, said nozzle inlet being open to said nozzle chamber, and said nozzle outlet further comprising a plurality of spaced bores through said nozzle, each bore being open at one end to said nozzle chamber and at its outer end to said annular pump chamber.

2. The invention are defined in claim 1 wherein said air tube extends in part through the annular chamber.

3. The invention as defined in claim 1 and further comprising a removable cap secured across the upper end of the housing, said cap being spaced upwardly from the open upper end of the conduit means and including at least one vent opening formed therethrough.

4. A circulating system for an aquarium having water and a material such as gravel on the bottom of the aquarium, said system comprising:
   a grid disposed upwardly from the bottom of the aquarium to form a chamber between the bottom of the aquarium and the underside of said grid, said material being disposed on said grid;
   said chamber communicating with the water in said aquarium through said grid and through said material;
   means for pumping the water in said aquarium from a point above said grid and into said chamber, said pumping means further comprising:
   a tubular housing having a first end positioned below the waterline of the aquarium and a second end positioned above the waterline of the aquarium, said housing including at least one port for establishing fluid communication between said aquarium water and the interior of said housing;
   conduit means extending longitudinally through a portion of the interior of said housing, said conduit means being open at its lower end to said chamber and open at its upper end to the interior of said housing; and
   means for raising water from the bottom of said housing to above the upper end of said conduit means and also above the waterline of the aquarium whereby water flows downwardly through said conduit means and into said chamber, wherein said raising means further comprises an air pump having a compressed air outlet and means for fluidly connecting said compressed air outlet to the interior of said housing at its lower end, wherein said conduit means extends substantially coaxially through said housing, said conduit means being spaced inwardly from said housing and forming an annular pump chamber therebetween and said raising means further comprising means for raising water from the bottom of said annular pump chamber to above the open upper end of the conduit means, wherein said fluid connecting means further comprises an air nozzle having an inlet and at least one outlet, said air nozzle being positioned within the interior of said housing and at the lower end of said annular pump chamber, an air tube for connecting the air pump outlet to the air nozzle inlet and said at least one air nozzle outlet being open to said annular pump chamber, wherein said air nozzle is annular in shape and is spaced upwardly from said first end of said housing, said nozzle outlet further having a plurality of spaced bores therethrough, each bore being open at one end to said air tube and at its other end to said annular pump chamber.

5. The invention as defined in claim 4 wherein said raising means further comprises means for fluidly connecting said air outlet to the interior of said housing at its lower end.

6. The invention as defined in claim 5 wherein said conduit means extends substantially coaxially through said housing, said conduit means being spaced inwardly from said housing and forming an annular pump chamber therebetween and said raising means further comprising means for raising water from the bottom of said annular pump chamber to above the open upper end of the conduit means.

7. The invention as defined in claim 6 wherein said fluid connecting means further comprises an air nozzle having an inlet and at least one outlet, said air nozzle being positioned within the interior of said housing and at the lower end of the annular chamber, an air tube for connecting the air pump outlet to the air nozzle inlet and said air nozzle outlet being open to said annular chamber.

8. A circulating system for an aquarium having water and a material such as gravel on the bottom of the aquarium, said system comprising:
 a grid disposed upwardly from the bottom of the aquarium to form a chamber between the bottom of the aquarium and the underside of said grid, said material being disposed on said grid;
 said chamber communicating with the water in said aquarium through said grid and through said material;
 means for pumping the water in said aquarium from a point above said grid and into said chamber, said pumping means further comprising:
 an elongated tubular housing having a first end positioned below the waterline of the aquarium and a second end positioned above the waterline of the aquarium, said housing including at least one port near its first end for establishing fluid communication between said aquarium water and the interior of the housing;
 conduit means extending longitudinally through a portion of the interior of said housing, said conduit means being open at its lower end to said chamber and open at its upper end to the interior of said housing; and
 means for raising water from the bottom of said housing to above the upper end of the conduit means and also have the waterline of the aquarium whereby water flows downwardly through said conduit means and into said chamber, said conduit means being spaced inwardly from said housing and forming an annular pump chamber therebetween and said raising means further comprising means for raising water from the bottom of said annular pump chamber to above the open upper end of the conduit means, said fluid connecting means further comprising an air nozzle having an inlet and at least one outlet, said air nozzle being positioned within the interior of said housing and at the lower end of the annular chamber, an air pump having an outlet and an air tube for connecting the air pump outlet to the air nozzle inlet and said air nozzle outlet being open to said annular chamber, said housing including a reduced diameter neck portion which engages said conduit means and said air nozzle being annular in shape and spaced upwardly from said reduced diameter neck portion thereby forming a nozzle chamber therebetween, said nozzle inlet being open to said nozzle chamber, and said nozzle outlet further comprising a plurality of spaced bores through said nozzle, each bore being open at one end to said nozzle chamber and at its other end to said annular pump chamber.

9. A circulating system for an aquarium having water and a material such as gravel on the bottom of the aquarium, said system comprising:
 a grid disposed upwardly from the bottom of the aquarium to form a chamber between the bottom of the aquarium and the underside of said grid, said material being disposed on said grid;
 said chamber communicating with the water in said aquarium through said grid and through said material;
 means for pumping the water in said aquarium from a point above said grid and into said chamber, said pumping means further comprising:
 an elongated tubular housing having a first end positioned below the waterline of the aquarium and a second end positioned above the waterline of the aquarium, said housing including at least one port near its first end for establishing fluid communication between said aquarium water and the interior of the housing;
 conduit means extending longitudinally through a portion of the interior of said housing, said conduit means being open at its lower end to said chamber and open at its upper end to the interior of said housing; and
 means for raising water from the bottom of said housing to above the upper end of the conduit means and also above the waterline of the aquarium whereby water flows downwardly through said conduit means and into said chamber, and
 a removable cap secured across the upper end of the housing to shield against splash from said housing, said cap being spaced upwardly from the open upper end of the conduit means and including at least one vent opening therethrough.

* * * * *

UNITED STATES PATENT AND TRADEMARK OFFICE
CERTIFICATE OF CORRECTION

PATENT NO. : 4,216,090

DATED : August 5, 1980

INVENTOR(S) : Denzel James Dockery

It is certified that error appears in the above-identified patent and that said Letters Patent are hereby corrected as shown below:

Column 2, line 6, delete "afore-mentioned" and insert --aforementioned-- therefor;

Column 4, line 53, delete "water" and insert --waste-- therefor;

Column 6, line 19, delete "are" and insert --as-- therefor;

Column 7, line 60, delete "have" and insert --above-- therefor.

Signed and Sealed this

Twenty-eighth Day of October 1980

[SEAL]

Attest:

SIDNEY A. DIAMOND

Attesting Officer

Commissioner of Patents and Trademarks